May 8, 1962 T. N. BUSCH 3,033,397
LOG HANDLING APPARATUS
Filed Dec. 22, 1958 4 Sheets-Sheet 1

INVENTOR.
Thomas N. Busch
By: Olson & Trexler
attys

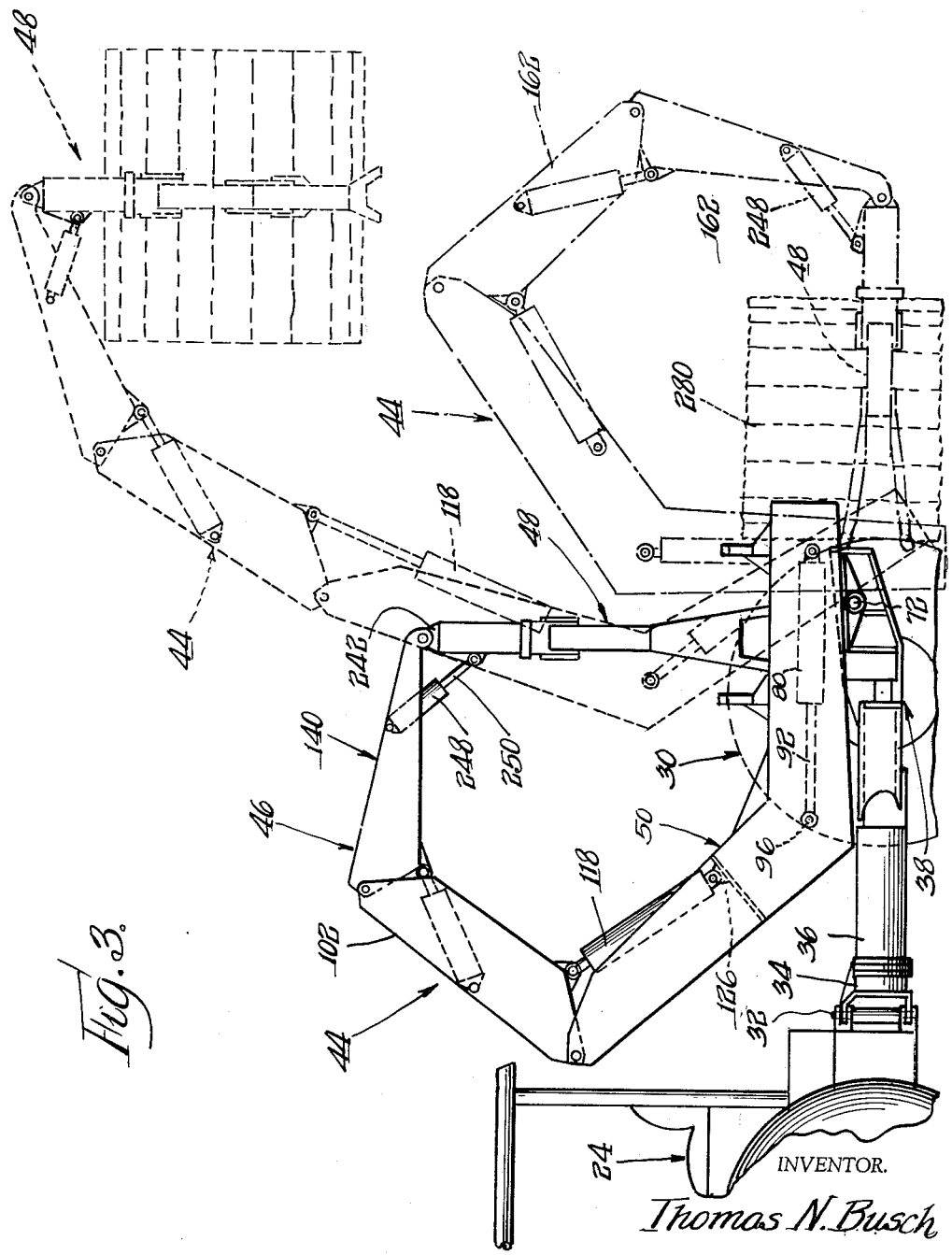

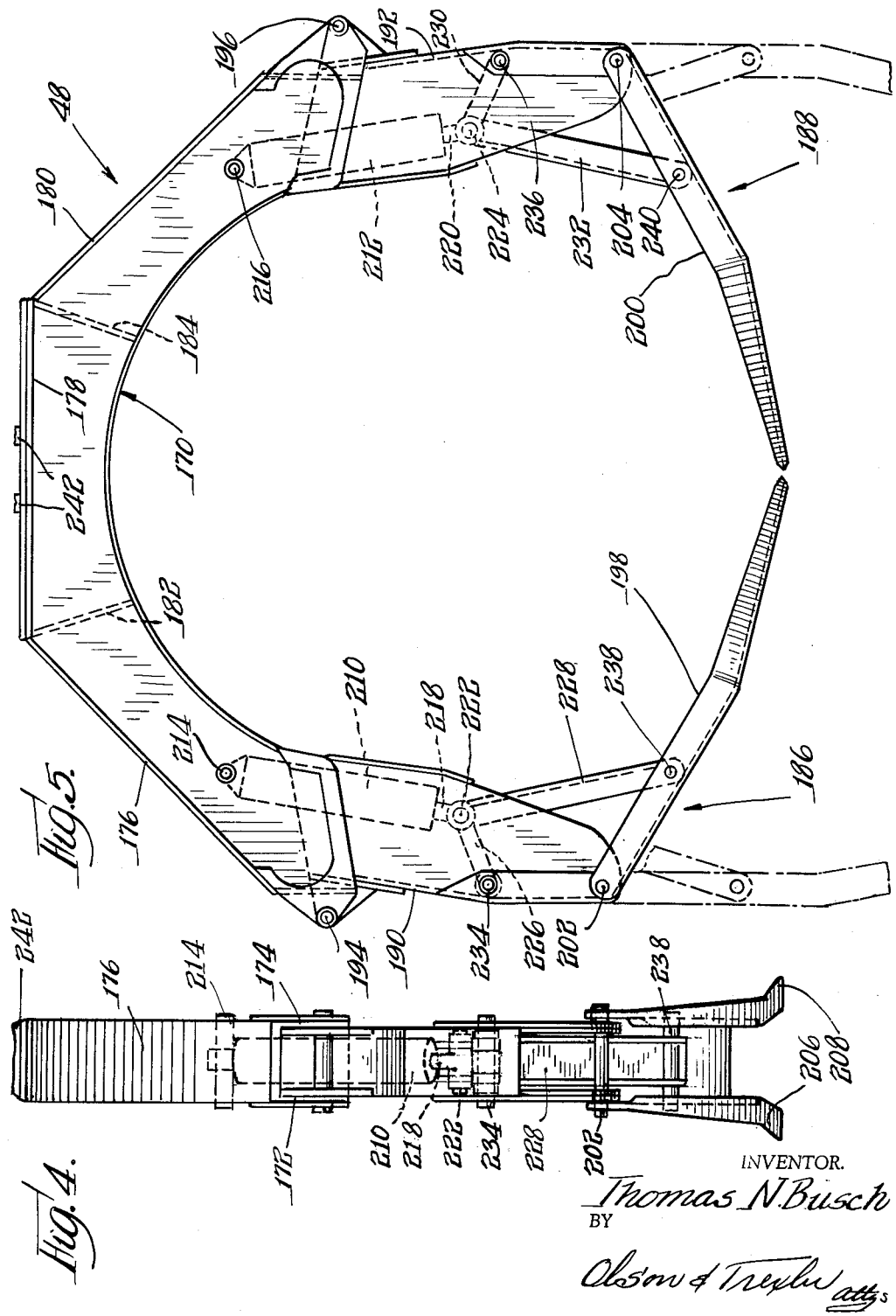

May 8, 1962 T. N. BUSCH 3,033,397
LOG HANDLING APPARATUS
Filed Dec. 22, 1958 4 Sheets-Sheet 4
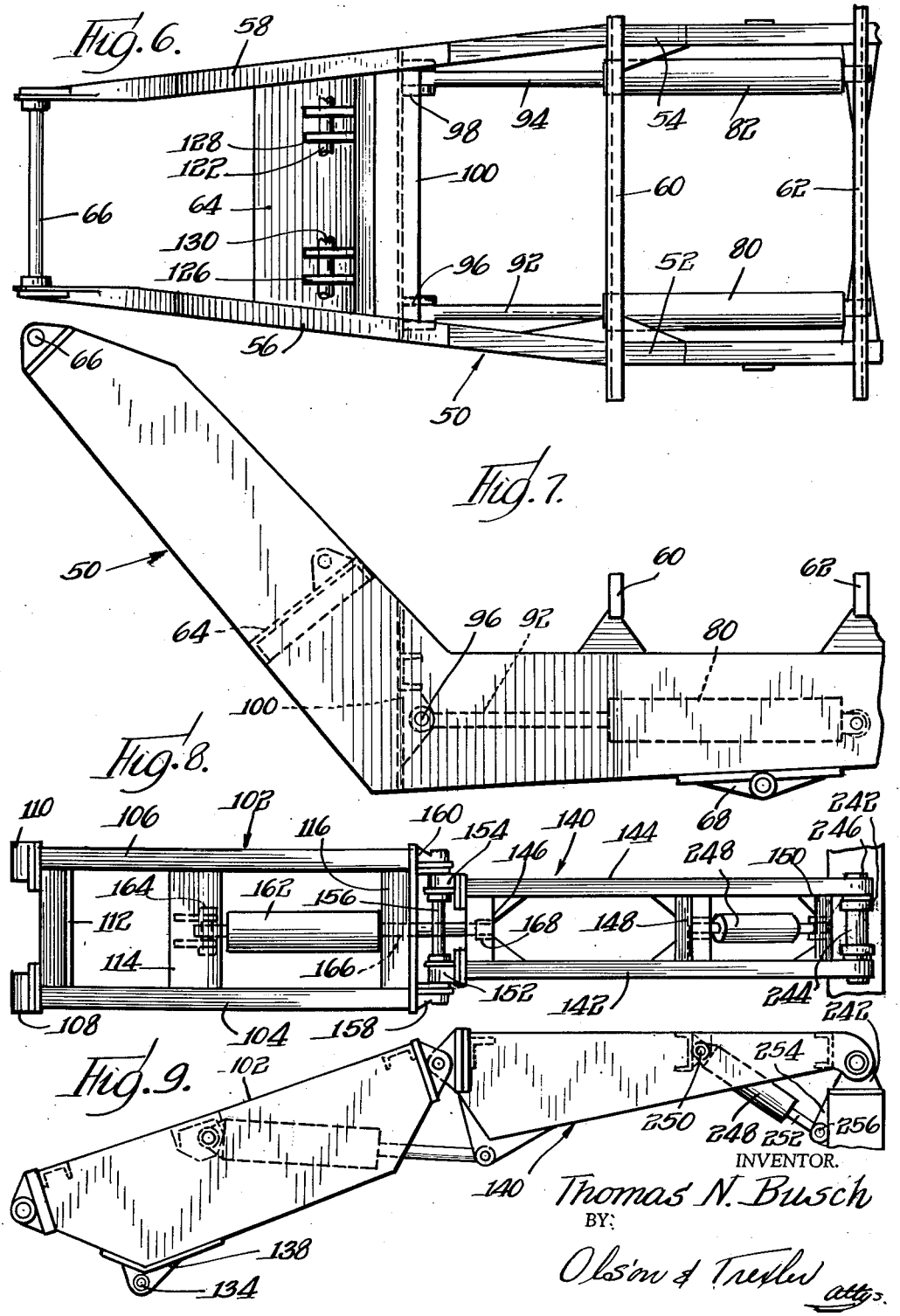
INVENTOR.
Thomas N. Busch
BY:
Olson & Trexler
attys.

United States Patent Office 3,033,397
Patented May 8, 1962

3,033,397
LOG HANDLING APPARATUS
Thomas N. Busch, Daphne, Ala., assignor of one-half to David W. Jasper, Chicago, and Benjamin E. Jasper, Kankakee, Ill.
Filed Dec. 22, 1958, Ser. No. 782,253
5 Claims. (Cl. 214—501)

The present invention relates to a novel log handling apparatus, and more particularly to a novel apparatus for picking up and transporting or loading bundles of logs.

In the harvesting of trees, it has been suggested that felled trees be cut into sections which are then gathered into bundles standing on end on the ground to await transportation to a log processing plant. It is an important object of the present invention to provide a novel apparatus for picking up a bundle of tree sections or logs standing on end and then transporting the bundle of logs to a desired point of discharge.

A more specific object of the present invention is to provide a novel apparatus capable of picking up a bundle of logs standing on end and transporting the bundle to a desired location and then either stacking the logs so that they are disposed horizontally or redepositing the bundle of logs on the ground with the logs standing on end.

Still another object of the present invention is to provide an apparatus capable of picking up a bundle of logs standing on the ground on end and then lifting the bundle for stacking on a suitable truck or other vehicle while continuously maintaining control over the logs so that they will be orientated in a predetermined manner on the vehicle.

A further object of the present invention is to provide a novel apparatus of the above described type which may be readily driven and manuvered for picking up bundles of logs located at various points and then transporting the logs to a desired point of discharge.

Other objects and advantages of the present invention will become apparent from the following description and the accompanying drawings wherein:

FIG. 3 is a fragmentary side elevational view showing the log pick up and handling mechanism in solid lines in a retracted position and in broken lines in various extended positions;

FIG. 4 is a fragmentary side elevational view showing a log pick up or gripping head structure of the apparatus;

FIG. 5 is an end elevational view of the head structure shown in FIG. 4;

FIG. 6 is a plan view showing a base section of an articulated boom structure of the apparatus;

FIG. 7 is a side elevational view of the portion of the apparatus shown in FIG. 6;

FIG. 8 is a plan view showing intermediate and outer sections of the articulated boom structure; and FIG. 9 is a side elevational view of the portion of the apparatus in FIG. 8.

Figure 1:
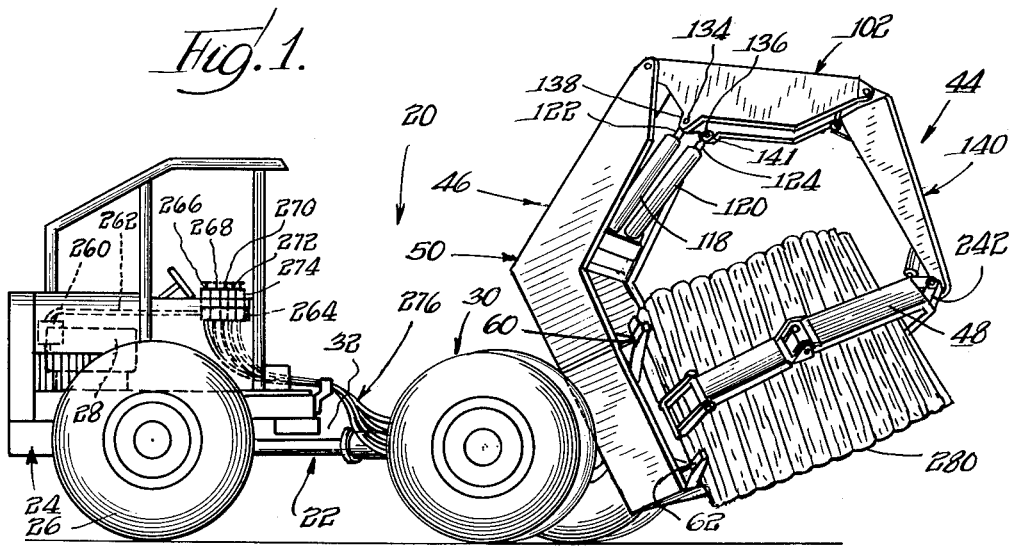
FIG. 1 shows a log handling or loading apparatus incorporating features of the present invention with a forward or tractor portion of the apparatus viewed from the side and a pivotally connected trailer portion of the apparatus illustrated in perspective.
Figure 2:
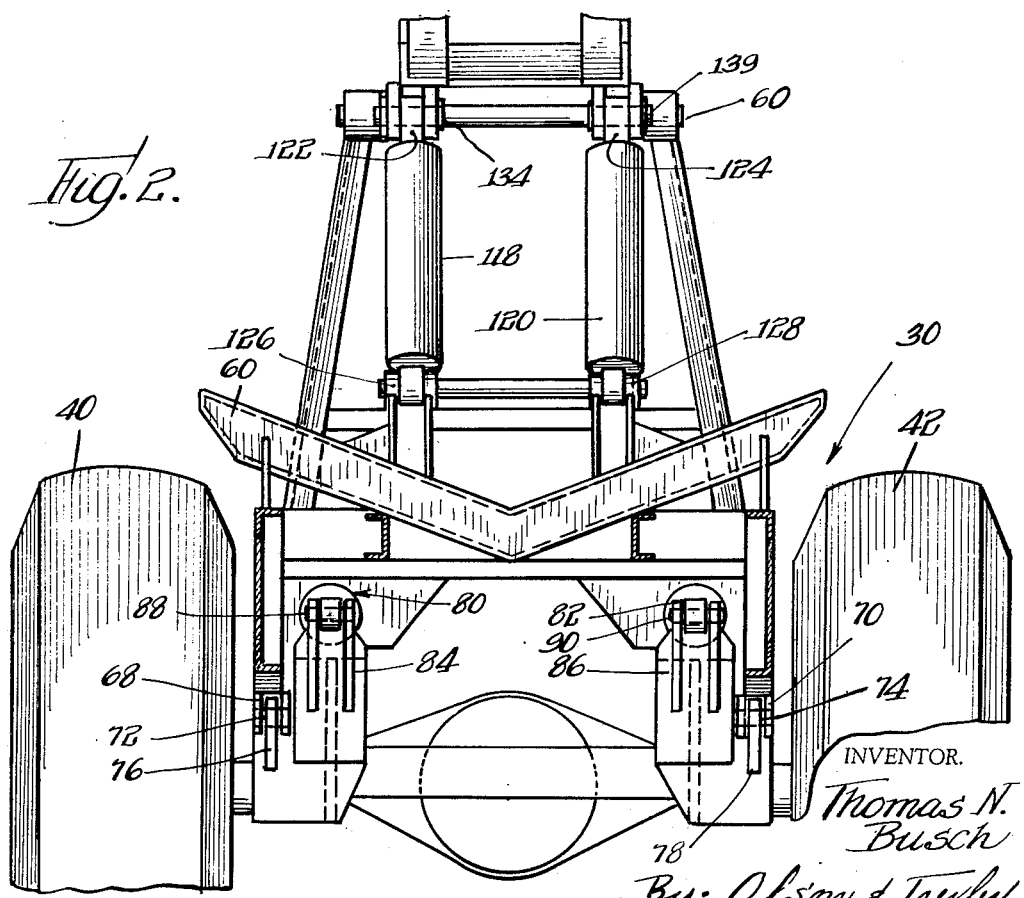
FIG. 2 is a fragmentary enlarged and simplified rear elevational view of the apparatus.

Referring now more specifically to the drawings wherein like parts are designated by the same numerals throughout the various figures, a log handling or loading apparatus 20 is shown in somewhat simplified form in FIG. 1. This apparatus includes a mobile base or frame 22 which is preferably self-propelled so that the apparatus may be driven to and from any desired location in a forest or the like for picking up and loading or otherwise handling bundles of logs. While the apparatus is especially suitable for picking up and loading bundles of logs deposited in a forest, it is to be understood that the apparatus may also be used for stacking or handling groups of logs which have been previously collected from a forest. As indicated in FIG. 1 the mobile base or frame 22 is provided with a forward tractor section 24 mounted on wheels 26 and including engine means 28 which provides power for driving the vehicle and operating a hydraulic actuating system which will be described below. The mobile base or vehicle also includes a trailer section 30 pivotally connected to the tractor section as at 32 for movement about a vertical axis, see FIGS. 1 and 3. As indicated generally in FIG. 3, telescoping horizontal sleeves 34 and 36 extend between the tractor and trailer sections of the vehicle and are rotatable relative to each other but retained against axial separation for permitting relative pivotal movement between the tractor and trailer about a horizontal axis. This arrangement facilitates manuvering the vehicle over rough terrain which may frequently be encountered in a forest.

The trailer section 30 of the apparatus is provided with a frame 38 supported by wheels 40 and 42. A crane or lifting mechanism 44 is mounted on the frame 38 for picking up and handling a bundle of logs in a manner described below. It is important to note that in accordance with the present invention, the lifting mechanism is provided with an articulated boom structure 46 and a log gripping and retaining head 48 which may be positively controlled and actuated so that a single operator sitting on the vehicle may readily pick up a bundle of logs standing on end on the ground and thereafter convey and/or lift the bundle of logs to a suitable point of discharge at which the logs amy be deposited and orientated in a predetermined manner.

Referring particularly to FIGS. 1–3 and 6–7, it is seen that the articulated boom structure is provided with a base section 50. The base section includes opposite side members 52 and 54 which have forward ends rigidly interconnected with additional opposite side frame members 56 and 58 respectively which extend upwardly and forwardly from the frame members 52 and 54 when the base section is in the retracted position shown in solid lines in FIG. 3. The side frame members 52 and 54 are interconnected by suitable transverse frame members including a pair of generally V-shaped saddle members 60 and 62 upon which a bundle of logs may rest during operation of the apparatus in the manner described below. A transverse frame member 64 extends between lower portions of the side frame members 56 and 58, and a shaft 66 extends between and is interconnected with upper ends of the side frame members 56 and 58 for the purpose to be described.

As shown in FIGS. 2, 3, 6 and 7, aligned apertured lugs 68 and 70 are welded or otherwise secured to lower edges of the opposite side frame members 52 and 54 for accommodating pivot pins 72 and 74 mounted by suitable bracket means 76 and 78 on the trailer frame 38. The arrangement is such that, as shown best in FIG. 3, the common axis of the pivot pins 72 and 74 is located toward but forwardly of the trailing end of the side frame members 52 and 54 so that portions of these side frame members will project beneath the pivot pins while major portions of these side frame members will extend above the pivot pins when the articulated boom structure is in the broken line positions shown in FIG. 3 for the purpose presently to be described.

In order to actuate or pivot the base section 50 of the articulated boom structure to and from the various positions indicated in FIG. 3, hydraulic actuating means is provided. More specifically, hydraulic cylinders 80 and 82 have ends respectively pivotally connected to brackets 84 and 86 fixed on the trailer frame 38 by pins 88 and 90. It will be noted that the pins 88 and 90 are located above and rearwardly of the axis of the pivot pins 72 and 74. Suitable pistons are reciprocably disposed in the double acting cylinders 80 and 82 and are connected with rods 92 and 94 which have outer ends pivotally connected at 96 and 98 to a member 100 extending between forward ends of the side members 52 and 54. It is to be noted that as a result of the above mentioned relationship between the axes of the pairs of pivot pins 72—74 and 88—90, the piston rods 92 and 94 are fully extended when the base section of the articulated boom structure is in solid line position shown in FIG. 3 whereby the rods will be placed under tension when the hydraulic cylinders are actuated so as to retract the rods and pivot the base section of the boom structure toward the broken line position shown in FIG. 3. It will be appreciated that the piston rods 92 and 94 are better able to withstand tension loads than compression loads when they are extended so that the arrangement just described enables the piston rods 92 and 94 to be of lighter weight and more economical construction. It will be observed that the arrangement is such that the piston rods 92 and 94 will be under tension loads at least until they are substantially fully retracted as in the right hand broken line position shown in FIG. 3.

The articulated boom structure is provided with an intermediate section 102 shown in FIGS. 1, 3, 8 and 9. This section comprises opposite side frame members 104 and 106 having aligned bearings 108 and 110 secured to their lower ends for receiving the shaft 66 and thereby pivotally connecting the boom section 102 with the base section 50. The side frame members 104 and 106 are interconnected with each other by suitable transverse frame members 112, 114 and 116.

In order to support and actuate the intermediate boom section 102 a pair of fluid or hydraulic cylinders 118 and 120 is provided, which cylinders respectively are associated with and adapted to actuate piston rods 122 and 124. Lower ends of the cylinders 118 and 120 are respectively pivotally connected to pairs of apertured lugs 126 and 128 welded or otherwise fixed from the transverse frame member 64 by suitable pivot pins 130 and 132. Upper ends of the piston rods 122 and 124 are pivotally connected by pins 134 and 136 to apertured lugs 138 and 141 fixed to lower margins of the side frame members 104 and 106 adjacent lower ends thereof. The arrangement is such that the cylinders 118 and 120 must be actuated so as to extend the piston rods for pivoting the intermediate boom section relative to the base boom section as shown in the central broken line position of the elements illustrated in FIG. 3. While the weight of the intermediate and outer sections of the boom structure will normally tend to return or lower the intermediate section relative to the base boom section, the cylinders 118 and 120 may be double acting, if desired, so as to insure positive control of the boom structure at all times.

The articulated boom structure includes an outer end section 140 composed of opposite side frame members 142 and 144. Suitable transverse frame members 146, 148 and 150 extend between and interconnect the side frame members 142 and 144. As shown best in FIGS. 8 and 9, aligned apertured ears or bearings 152 and 154 are secured to lower ends or inner ends of the side frame members 142 and 144 for accommodating a shaft 156. The shaft 156 also extends into apertured ears or bearings 158 and 160 fixed to outer ends of the side frame members 104 and 106 and thereby pivotally connects the outer boom section 140 with the intermediate section 102. In order to support or actuate the outer boom section 140, a double acting hydraulic cylinder 162 is provided and has one end pivotally connected at 164 to the transverse frame member 114 of the intermediate boom section. The cylinder 162 is adapted to actuate a piston rod 166 which has an outer end pivotally connected as at 168 to a suitable lug secured to the transverse frame member 146 adjacent the lower end of the outer boom section 140.

As shown in FIGS. 1 and 3–5, the gripping head 48 comprises a rigid upper body structure or yoke 170 which is adapted partially to embrace a bundle of logs. The yoke 170 is built up from opposite side frames 172 and 174 and a plurality of top panels 176, 178 and 180 which are welded or otherwise secured to upper margins of the side members. Suitable transverse members 182 and 184 extend between and support intermediate portions of the side members.

The gripping head structure is provided with a pair of jaw structures 186 and 188, respectively, connected with opposite ends of the yoke and adapted to open so as to permit the gripping head to be applied to bundle of logs and then closed for retaining the logs in the manner described more fully below. As shown best in FIGS. 4 and 5, the jaw structures 186 and 188, respectively, include first sections 190 and 192 respectively pivotally connected with opposite ends of the yoke at 194 and 196. Second jaw sections 198 and 200 are pivotally connected with outer ends of the sections 190 and 192 respectively by pivot pins 202 and 204. As indicated in FIGS. 1 and 4 the jaw section 200 comprises a pair of diverging and tapering fingers 206 and 208, and it is to be understood that the jaw section 198 is similarly constructed. This construction of the jaw sections 198 and 200 provides improved support for a bundle of logs being lifted by the gripping head.

In order to actuate the jaw structures of the gripping head, double acting hydraulic cylinders 210 and 212 are provided, which cylinders are respectively pivotally connected adjacent opposite ends of the yoke by pins 214 and 216. The cylinders respectively actuate piston rods 218 and 220 which have their outer ends pivotally connected as at 222 and 224 to pairs of links 226—228 and 230—232. As shown clearly in FIG. 5, the links 226 and 230 are relatively short and are respectively pivotally connected with intermediate portions of the jaw sections 190 and 192 by pins 234 and 236. The relatively long links 228 and 232 are pivotally connected with the outer jaws sections 198 and 200 by pins 238 and 240. The arrangement is such that when the piston rods 218 and 220 are retracted the jaw sections are closed to the solid line positions shown in FIG. 5 for clamping and retaining a bundle of logs against the yoke, and when the piston rods are extended, the jaw sections are moved to the broken line positions shown in FIG. 5 so as to release the bundle of logs and permit the gripping head to be applied to another bundle.

As shown in FIGS. 1, 3, 8 and 9, apertured ear means 242 is welded to the central upper plate 178 of the yoke. The ear means accommodates a shaft 244 extending through suitable aligned bearings 246 at the outer end of the outermost boom section 140 for pivotally connecting the gripping head to the boom structure. In order to adjust the position of the gripping head relative to the boom structure, a double acting cylinder 248 is provided, which cylinder has an end pivotally connected to the transverse frame member 148 of the outer boom section by a pin 250. The cylinder actuates a piston rod 252 pivotally connected to an apertured ear 254 welded to the yoke by a pin 256.

The apparatus is provided with suitable hydraulic means for actuating the various cylinders described above. It will be appreciated that such hydraulic means may include various combinations and arrangements of pumps, control valves, relief valves, hydraulic lines and the like. For example, hydraulic circuit means shown generally in FIG. 1 includes a suitable pressure pump 260 driven from the engine of the vehicle tractor. An inlet is connected with a suitable hydraulic fluid reservoir, not shown, and an outlet of the pump is connected to a conduit 262 which extends to a common manifold 264 of a group of control valves 266, 268, 270, 272 and 274 mounted at any convenient location in the cab of the tractor. Suitable hydraulic lines indicated generally by the numeral 276 extend from the valves to the various hydraulic cylinders described above so that operation of the valve 266 controls the cylinders 80 and 82, operation of the valve 268 controls the cylinders 118 and 120, the valve 270 functions to control the cylinder 162, the cylinder 248 is controlled by the valve 272, and the valve 274 functions to control the gripping head cylinders 210 and 212.

The apparatus may be operated for handling a bundle of logs 280 in the following manner. It is assumed that the bundle of logs 280 is standing on the ground on end as indicated in dot and dash lines at the right side of FIG. 3 and it is desired to pick up the bundle of logs and deposit it on a truck or a suitable vehicle, not shown. It is also assumed that the articulated boom structure and the gripping head are disposed in the retracted position shown in solid lines in FIG. 3. Starting with the assumed condition, the vehicle is first manuvered so that the back end of the trailer is adjacent the standing bundle of logs. Then the control valves are manipulated so that the articulated boom structure is tilted and extended to the position shown in dot and dash lines at the right side of FIG. 3. It will be noted that in this position, the outer end of the boom structure extends over and downwardly along the bundle of logs at the opposite side thereof from the trailer and the gripping head extends in a substantially horizontal plane and around the bundle of logs. When this has been accomplished the valve 274 is manipulated so as to actuate the gripping head cylinders 210 and 212 in a manner which causes the jaw structures of the gripping head to close about the bundle of logs. In addition, the cylinders 118, 120, 162 and 248 are controlled so that the gripping head positions and securely retains the bundle of logs against the saddle members 60 and 62 on the base section of the articulated boom structure. Then, the cylinders 80 and 82 are actuated so as to tilt the base section of the articulated boom structure from the fully extended position shown at the right hand side of FIG. 3 toward the fully retracted position shown in solid lines in FIG. 3 so that the bundle of logs is raised from the ground in the manner shown in FIG. 1. The saddle members which engage the logs oppositely from the gripping head aid in supporting and maintaining control of the logs during the initial relatively difficult operation of tilting the logs from the vertical toward the horizontal. It will be appreciated that after the bundle of logs is raised on and supported by the saddle members, the vehicle may be driven to any desired point of discharge without placing undue strain on the outer portion of the boom structure. When the point of discharge has been reached, the control valves are actuated so as to extend the articulated boom structure in the manner shown in broken lines in the central portion of FIG. 3 so that the bundle of logs is elevated, shifted rearwardly of the trailer and maintained in horizontal relationship for loading onto the bed of a suitable truck or the like or onto previously stacked logs. After the bundle is properly positioned on the truck, the gripping head cylinders are actuated so as to open the jaws to release the logs. It will be appreciated that with this structure, the logs are positively controlled at all times and orientated in a predetermined manner so that a single operator may quickly and easily load the logs onto a truck or a suitable vehicle. It will also be noted that, if desired, the bundle of logs may be returned to the ground in an upright position merely by tilting the base section of the articulated boom structure and then opening the jaws of the gripping head. Of course, the apparatus could be manipulated, if desired, so as to stack the bundle of logs on the ground in a horizontal position.

While the preferred embodiment of the present invention has been shown and described herein, it is obvious that many structural details may be changed without departing from the spirit and scope of the appended claims.

The invention is claimed as follows:

1. An apparatus for handling a bundle of logs standing on end comprising mobile frame means, gripping head means including opposing jaw structures substantially bisected by a predetermined plane for releasably embracing and positively retaining a bundle of logs, said frame means including a portion tiltable about a predetermined horizontal axis disposed substantially parallel to said predetermined plane in the horizontal direction between a substantially vertical position adjacent the ground and a substantially horizontal position, and means on said mobile frame means and supporting said gripping head means and extendible over and beyond a bundle of logs standing on end for positively positioning the gripping head means for generally horizontally embracing and retaining a bundle of logs standing on end on the ground and holding the bundle of logs against said portion of the mobile frame means when said portion is in said vertical position and for subsequently raising the bundle of logs from the mobile frame means for stacking at a desired point of discharge.

2. An apparatus for handling a bundle of logs comprising frame means, gripping head means including opposing jaw structures substantially bisected by a predetermined plane for releasably retaining a bundle of logs, a boom structure including a plurality of articulated sections mounted on said frame means and supporting said gripping head means, one of said sections being pivotally connected at a point between and substantially spaced from its ends to said frame means for movement to and from generally horizontal and vertical positions about a predetermined horizontal axis disposed substantially parallel to said predetermined plane in a horizontal direction, log supporting means on said one section, and means for actuating said boom structure and said gripping head means for positioning the gripping head means for retaining a bundle of logs against said log supporting means on said one section when said one section is in and moved between said horizontal and vertical positions for selectively picking the bundle of logs up from or depositing the bundle of logs in an upstanding position on the ground and also for raising the bundle of logs above said log supporting means and orientating the logs generally horizontally for stacking.

3. An apparatus for handling a bundle of logs comprising mobile frame means, gripping head means including jaw structures substantially bisected by a predetermined plane for releasably retaining a bundle of logs, and means including a boom structure on said frame means and supporting said gripping means for positively positioning the gripping means for embracing and retaining a bundle of logs standing on end on the ground and for subsequently raising the bundle of logs and orientating the logs so that they are disposed generally horizontally, said boom structure including a plurality of sections pivotally connected to each other and to said gripping head means for movement about generally horizontal axes disposed generally parallel to said plane in a horizontal direction, one of said sections also being pivotally connected to said frame means for movement about a generally horizontal axis to and from generally horizontal and substantially upstanding positions, and means on said one section for accommodating and supporting a bundle of logs retained by said gripping means both when said one section is in the horizontal and upstanding positions.

4. An apparatus for handling a substantially cylindrical bundle of logs comprising mobile frame means, gripping head means including a central yoke structure for embracing and engaging a substantial peripheral portion of a bundle of logs and oppositely disposed shiftable jaw structures pivotally connected with opposite ends of the yoke structure and complementing the yoke structure for substantially completely embracing a bundle of logs and for releasably retaining a bundle of logs, each of said jaw structures including a plurality of articulated portions said jaw structures being substantially bisected by a predetermined plane, and means including an articulated boom structure mounted on said frame means and supporting said gripping head means for movement in a plane extending transversely of said predetermined plane for positively positioning the gripping head means for generally horizontally embracing a mid portion of a bundle of logs and retaining a bundle of logs standing on end on the ground and for subsequently raising and retaining the bundle of logs with the logs orientated in generally horizontal positions.

5. An apparatus for handling a bundle of logs comprising a self-propelled vehicle, gripping head means including a central rigid yoke structure for extending around and engaging a substantial portion of a bundle of logs and oppositely disposed jaw structures articulated to opposite ends of said yoke structure for releasably substantially completing encirclement of a bundle of logs, said jaw structures being substantially bisected by a predetermined plane a boom structure pivotally connected to said vehicle for movement about a horizontal axis generally parallel to said predetermined plane in a horizontal direction and including a plurality of sections which are pivotally interconnected with each other and with said gripping head means for relative movement about generally horizontal axes, and self-contained fluid pressure actuating means on said vehicle for actuating said boom structure and said gripping head means for positioning the gripping head means for embracing a mid portion of a bundle of logs standing on end on the ground and for subsequently raising the bundle of logs and orientating the logs in generally horizontal positions.

References Cited in the file of this patent
UNITED STATES PATENTS

| | | |
|---|---|---|
| 1,693,074 | Falco | Nov. 27, 1928 |
| 1,879,120 | Davey | Sept. 27, 1932 |
| 2,332,962 | Barrett | Oct. 26, 1943 |
| 2,720,988 | McColl | Oct. 18, 1955 |
| 2,754,016 | Anderson | July 10, 1956 |
| 2,827,715 | Wagner | Mar. 25, 1958 |
| 2,831,589 | Way | Apr. 22, 1958 |
| 2,875,913 | Gohrke | Mar. 3, 1959 |
| 2,876,816 | Busch et al. | Mar. 10, 1959 |